United States Patent [19]

Kiepe

[11] 4,267,432
[45] May 12, 1981

[54] INSTALLATION CIRCUITRY FOR ELECTRIC WATER HEATERS

[76] Inventor: Paul E. Kiepe, 2141 First Ave. S., Payette, Id. 83661

[21] Appl. No.: 907,990

[22] Filed: May 22, 1978

[51] Int. Cl.³ .............................................. H05B 1/02
[52] U.S. Cl. .................................. 219/328; 219/330; 219/331; 219/487; 219/489
[58] Field of Search ............................... 219/487–489, 219/320, 321, 327–331, 506

[56] References Cited

U.S. PATENT DOCUMENTS

| 1,930,551 | 10/1933 | Blashfield | 219/331 |
| 2,391,071 | 12/1945 | Price | 219/321 |
| 3,352,999 | 11/1967 | Macoicz et al. | 219/321 |
| 3,353,001 | 11/1967 | Macoicz et al. | 219/321 |
| 3,467,814 | 9/1969 | Macoicz | 219/331 |

FOREIGN PATENT DOCUMENTS 2656376  6/1978  Fed. Rep. of Germany ........... 219/330

Primary Examiner—Elliot Goldberg
Assistant Examiner—Bernard Roskoski

[57] ABSTRACT

Electric installation circuitry that provides means for interconnecting with conventional storage-type electric water heaters of the sort energized from three-wire mains and controlled as to energy use thermostatically, the combination of hand switching and automatic signaling to supply both cues and means for the users of such water heaters to effect energy savings.

3 Claims, 3 Drawing Figures

INSTALLATION CIRCUITRY FOR ELECTRIC WATER HEATERS

SUMMARY OF THE INVENTION

The improved circuitry of the invention introduces to the art of installing conventional electric water heaters of the thermostatically controlled storage type, novel technology embodied in hand-operated switching—such as provided in conventional electrical wall switches or the like—and automatic electric signaling—such as provided in conventional gas-discharge tubes with suitable series resistors—by means of which the installer offers to the water heater user both simple means of saving electric energy and informative signaling to help him do so.

According to the inventive circuitry herein, the technical means are interconnected as follows: the principal hand switch in series with the conventional juncture between one high-voltage power-supply leg and the principal thermostat; the supplementary hand switch in series with the other high-voltage power-supply leg and the conventional supplementary heater element; and a signal lamp, with associated resistor when required, in series with the power-supply low-voltage leg and the juncture of the heater's principal thermostat and the added principal hand switch: said signal lamp and said principal hand switch being installed most usefully in physical nearness to each other.

OBJECT OF THE INVENTION

The ultimate object of installing the described type of electric water heaters in homes, churches, factories and the like through use of the invention's improved circuitry; and the ultimate object of using the improved circuitry to retrofit the 20–30 million such water heater installations in the United States operating now (circa 1978), is to provide such hot water services as are needed, but to lessen the heating of water when not needed hot, thus promoting energy conservation.

The proximate object of the invention is to give into the hands of practioners of the art of water heater installation means for supplying a novel service to water heater owners and other users, namely a modicum of improved technology whereby such persons may participate meaningfully in their daily lives in our nation's considerable dedication to energy saving. In substance, the invention aims at transforming water heater installation circuitry that is automatic into circuitry that is semi-automatic or, more descriptively, "manualmatic" (a trade name employed by the inventor herein), thus producing a mode of energy conservation dependent, not alone upon the novel circuitry and its installation, but also upon the ultimate user's employment thereof.

A further ultimate object of the invention, through its signal lamp which blinks on and off attractively, is to intersect citizen-users of the installed inventive combination in electricity generally. Questions as to effects upon the signal's blinking following water use and indeed without use at times, and from the added hand switching will arise. Thereupon can follow, from community educational resources, much-needed citizen education in electrical fundamentals as sequelae to the questioning. For many ultimate users of the novel installation, these advances may mark the beginning step away from a rising community assent to automation within a society already awash in its electric and electronic mysteries and their all-too-plain threat to human voluntarism, hence human freedom.

These and other objects and means of the invention will become apparent from the detailed specifications and drawings which follow.

ALTERNATIVE ENERGY SAVING IN WATER HEATER INSTALLATIONS

For energy saving in the electric heating of water, three alternative ideas exist, or have been proposed, for use as substitutes for the present invention: (1) to encourage users of electric water heaters to lower the temperature setting of the thermostats, (2) to encourage users of installed heaters and makers of new ones to increase insulation in order to lessen heat escape from water storage, and (3) to encourage both users of installed heaters and manufactures of new ones to provide added automation embodied in switching that is time-controlled.

Compared to the present invention, none of these alternatives seems to the present inventor more useful than the within teaching because of their being no more practically adaptable to the over-all complex of technical availabilities and human tendencies with which the situation bristles. Many users do not wish—and advisedly so—to lower thermostats if they have dishes and clothing to wash and rinse, whether in automatic machines or otherwise, because the higher temperatures both clean and sanitize better. Users resist increasing insulation around installed heaters, because either of the difficulty or of the unsightliness of the result unless great expense is gone to. Manufacturers likewise resist urgings to increase heater insulation thicknesses, because sales appeal thereby declines in an unfamiliarly bulky appliance so unlike the slim 'flameless' models so widely advertised as de rigueur. As to time-switching, certainly this alternative appears to have more merit than the other two. However, neither this further venturing into automation, any more than the other proposals, offers significant introduction to improved education in the electrical puzzlements amongst citizen-users such as is offered in the present invention.

DESCRIPTION OF DRAWINGS

FIG. 2 illustrating in plan view the signal-lamp/principal-hand-switch combination in electrical connection with a schematically illustrated partial circuit.

FIG. 3 shows the whole circuit schematically, including both the conventional electrical elements and circuitry and also the interconnective inventive circuitry with its added elements, namely the principal hand switch/signal lamp combination of FIG. 2 as well as the supplementary hand switch controlling the supplementary conventional heater element.

OPERATION AND USE FOLLOWING INSTALLATION

Figure 2:
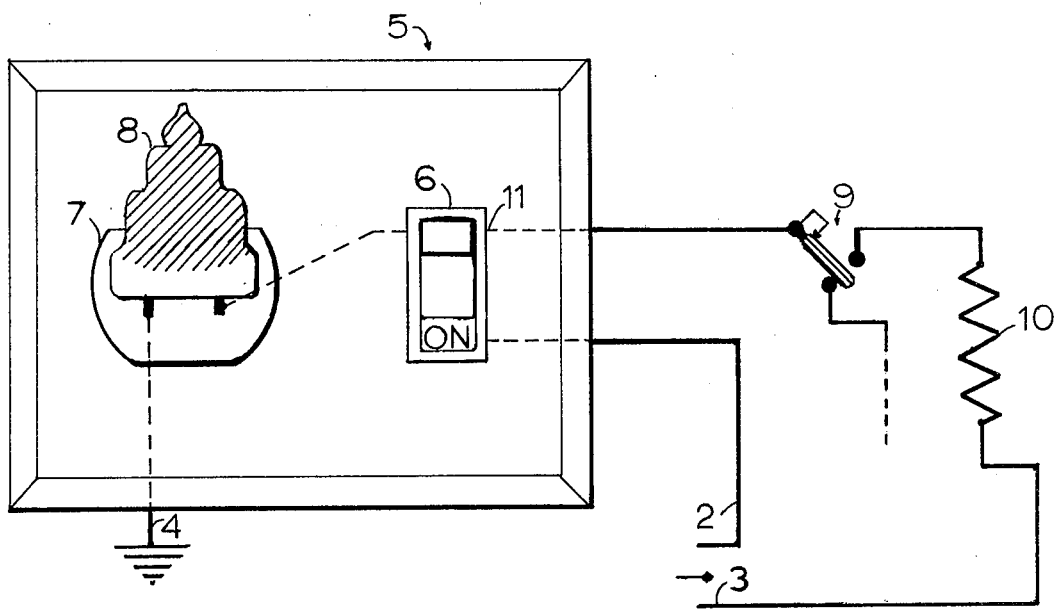
FIG. 2 and FIG. 3 show the invention in preferred embodiment.

The inventive circuitry and associated electrical elements operate, following their installation, so as to give into the ultimate user's hand the option to save electric energy. As a means of intercourse between the technology provided and the user's psycho-physical gestalt, the inventive idea relies upon the strategem of a signal code. The inventive combination produces a system of signals for the user wherewith the user guides manipulations of the principal hand-switch lever in making choices between energy-use and energy-conservation options. Such intercourse, to be successful, does not exceed average human capacities; it's no more difficult, once the simple code is learned, than answering the right door in response to one tone of a two-tone doorbell.

One crux (of two) of the read-out function of the circuitry lies in the signal lamp's electrical circuit positioning, in the manner described hereinbefore, between the supply line's middle leg and the principal hand-switch/principal-thermostat junction. The way this positioning works out electrically is to energize and de-energize the signal lamp automatically. At times, the lamp—grounded at one terminal—makes it return circuit through one electric-supply high-voltage leg; at times, through the other; and at times, through neither (which shuts the signal off). Each alternative depends upon the combined effects of the on/off positioning of the principal hand switch and the controlling thermostat, the former of the present inventive combination and the latter of the conventional water heater with which interconnection is made. The permutations of the combinations of these transients produce the code readings the user observes and employs. The permutations appear in the Option Table which follows. The Option Table shows four (a) Options, numbered 1, 2, 3, and 4. These are tabulated with (b) Manual Switch positions, (c) Electric Signal displays, (d) Thermostat Positions, and (e) Heater Element conditions. The Option Table entries (d) and (e) appear in their respective columns in parentheses to indicate their being, from the user's standpoint, hidden.

OPTION TABLE

| (a) Option Number | (b) Hand Switch | (c) Electric Signal | (d) Thermostat | (e) Heater Element |
| --- | --- | --- | --- | --- |
| 1 | ON | ON | (ON) | (ON) |
| 2 | ON | ON | (OFF) | (OFF) |
| 3 | OFF | ON | (ON) | (OFF) |
| 4 | OFF | OFF | (OFF) | (OFF) |

A second crux of the read-out function of the circuitry lies in the principal Hand Switch (b) and the Electric Signal (c) being, as has been suggested hereinbefore, physically near to one another. Physically, that is topographically, the installation of the invention must occur in this manner if the ultimate user is to see the Switch (b) and the Signal simultaneously and thus become aware of the (d) and (e) hidden conditions.

As an example of the circuit's work-out in serving the ultimate user, following its installation in the manner suggested, the Option Table suggests the user chooses Options 1 or 2 to establish the circuitry in its conventional attitude—all systems apparently ON or apparently OFF. But what condition actually pervades? Changing the Hand Switch to OFF will tell. If the Electric Signal remains ON (Option 3), it is apparent that, although the Heater Element be OFF (i.e., not heating), the Thermostat is ON (i.e., 'unsatisfied,' in position to heat with Hand Switch ON). If the Electric Signal blinks OFF (Option 4), it is apparent that both the Heater Element under control and the controlling Thermostat are OFF (i.e., the Thermostat 'satisfied' because storage water fully heated and, hence, controlled Heater Element not energized). But let us suppose now, while observing the Signal during Option 4, the Signal lamp blinks ON, as a result of hot water use from storage or as a result of storage-water cool-off. Here, typically, occurs the inventive circuitry's offer to the ultimate user of an opportunity for energy saving of the sort this invention aims at. Here appears the contrast between the old circuitry that is automatic and the new circuitry that is "manualmatic." If the user sees ahead no need for added hot water for some hours, although the Signal tells the condition of the Thermostat as ready to heat, the user opts for energy saving. He permits Option 3 to persist by leaving the Hand Switch OFF. Later on, only when the user knows positively of a present or impending hot water need, will Option 1 be resorted to.

PHYSICAL LOCATION OF PRINCIPAL MANUAL SWITCH AND SIGNAL

So that the options for energy saving offered by the principal-switch/signal-lamp combination of the invention may, once installed, attract use, it is important the installer give forethought to the combination's physical location on the premises. The invention does nothing of itself except in the short run—i.e., the signal lamp blinks on and off. In the long run, the user, the user's co-workers, the user's family, the user-monitor in factory, church, school or the like effects the energy conservation by putting the principal-switch/signal-lamp to use. This means that between switch/signal and user there must occur fairly frequent normal-routine confrontations, so that the user does not have to detour out of customary ambulations to bring them about. The user's habitual movements should produce, as a result of the installer's wise choice of switch/signal siting, repeated daily eye-contact with the apparatus. From such stimulus, school and factory water heaters will be switched off each weekend; church water heaters for days at a time; family water heaters overnight and during long and short family absences from home, etc., etc.

SITING AND MANAGEMENT OF SUPPLEMENTARY HAND SWITCH

The suggested rule for installers to follow with respect to the supplementary hand switch of the inventive circuitry differs markedly, in typical installations, from the suggestions as to site location of the hand switch described as 'principal' and its associated signal lamp. The supplementary hand switch should be installed, for example in a one-family residence, near where the family does its laundry, for it is on wash days a full store of hot water often is required. Otherwise, particularly in the case of small families, the supplementary switch circuited to an electric water heater with storage of 40 gallons or more—typical in the U.S.—can be switched off. From this procedure, tested thus far in two single-family homes, average savings per month have been noted, with the principal switch being little employed, of 200 kwh. Certainly to the rhetorical question, 'Why heat large quantities of water when only small quantities are required usually?' the invention's supplementary hand switch is the answer. The switch, moreover, need not be situated near either the principal switch or the signal lamp aforesaid. Generalized, the rule for site location is: install the supplementary switch where occasional large demands for hot water typically arise.

DESCRIPTION OF CONVENTIONAL POWER SOURCE

Figures 1, 3:
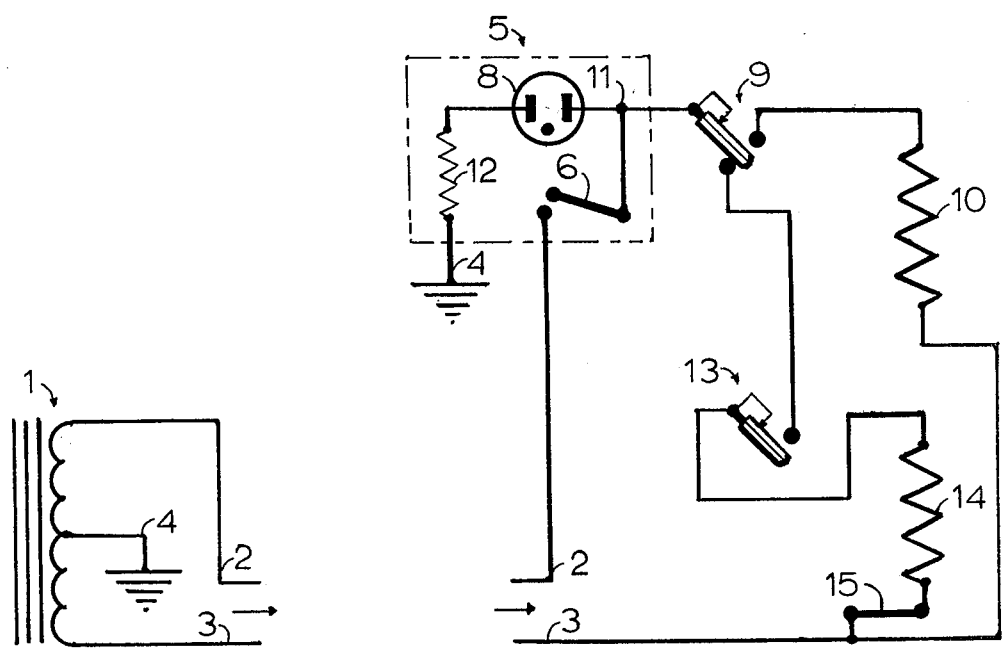
FIG. 1 shows the conventional 3-wire electrical supply, with low-voltage leg grounded, from which electrical water heaters adaptable to the invention conventionally draw their energy.

The invention will now be further described by reference to the drawings, wherein FIG. 1 represents the distal end of a commercial or residential electric power source from conventional U.S. mains. Shown, is half of the final power transformer 1, with high-voltage legs 2 and 3 and low-voltage grounded leg 4 proceeding therefrom. It is the nation-wide convention of hooking up power sources to user's water heaters from approximately this sort of mains circuitry that makes one part of the within invention work: the part, that is, comprising the signal lamp, the principal hand switch, and the interconnective circuitry. FIG. 1 shows the mains detail productive of one part of the invention's inner workings. At the millions of sites where such water heating occurs, were no low-voltage 'middle' leg 4, one would have to be supplied to make the signal lamp work as it does, probably making that part of the inventive idea infeasible. Were leg 4 not conventionally grounded, as FIG. 1 shows in reflection of current practice, there would be a third-wire requirement, at some added cost, to make the signal lamp part of the invention function. The arrow between leg 2 and leg 3 represents electric power going out. (In FIGS. 2 and 3 corresponding arrows show electric power from the mains transformer 1 going in.) The power legs 2, 3 and 4 correspond in all FIGS; they are to be viewed as momentarily energized.

DESCRIPTION OF PREFERRED EMBODIMENT - ABRIDGED VERSION

In FIG. 2 the principal hand switch 6 and the signal lamp 8 of the inventive circuitry are shown mounted physically on switchplate 5. They also are shown interconnected electrically with the electrical elements of this abridged representation of the preferred embodiment of the invention. The conventional water heater circuitry depicted consists of adjustable principal thermostat 9 interconnected with principal heater element 10, high-voltage power legs 2 and 3 and connective conductors. At circuit juncture 11 the blade terminal of thermostat 9 and a terminal of the principal added hand switch 6 and the added signal lamp 8 join. The other terminal of principal manual switch 6 connects to high-voltage terminal 2. It is the hand switch 6 the user employs, in conjunction with the signaling of 8, the signal lamp, to attain the options of the Option Table. The other terminal of lamp 8 connects to ground and thus to the 'middle' low-voltage leg of the power supply. The second terminal of the principal thermostat 9 connects to one terminal of the conventional equipment's principal resistive heater element 10. The principal heater element's other terminal completes the power-return circuit by connection to high-voltage leg 3. Particularly illustrated in FIG. 2 is the physical nearness of added principal switch 6 and signal lamp 8, situated even so near as to be mounted on the same switch plate 5: however, this particular mounting of switch and signal is meant to be illustrative only of a sufficient proximity between the two for the ultimate user to view them simultaneoulsy. In FIG. 2 the signal lamp 8 is shown lighted, although thermostat 9 is shown open: thus, the momentary state of the illustration appears to the user, who cannot see the thermostat, as Option 1 of the Option Table. But is the heater element 10, also hidden, indeed heating? The user does not know until switch-off of principal hand switch 6, thus disconnecting from the equipment power leg 2. Now he knows. For if lamp 8 goes dark, which would happen as sequel to the FIG. 2 condition, the user—from noting the appearance of Option 4 of the Option Table—recognizes 9 as 'satisfied,' heater element 10 not heating ('OFF'), and hence the supply of hot water storage controlled by 9 at or very near maximum.

In the installation procedure of retrofitting with the inventive additions such a situation as FIG. 2 depicts, the installer has snipped, or disconnected, the conductive wire between thermostat 9 of the conventional water heater and circuit leg 2—this may occur at the nearest convenient junction box—then has inserted switch 6 conductors into the line for attachment to the switch/signal apparatus. Taking care to keep circuit legs and switch terminals in correct relationship, as shown, the installer has made the connections pictured, and at the switchplate has made also the appropriate signal-lamp 8 connection to ground.

DESCRIPTION OF PREFERRED EMBODIMENT - FULL CIRCUIT

FIG. 3 shows the inventive circuitry fully connected electrically in combination with the conventional two-heater-element, two-thermostat electrical circuitry of the commonest type of electric water heater in the U.S. circa 1978, the type presently most wasteful of electric energy. At switchplate 5, FIG. 3 shows the same components—but in this instance schematically—as FIG. 2: namely, principal hand switch 6 and signal lamp 8 of the present invention's installation circuitry; only here is shown, in addition, signal-lamp series resistor 12 which protects the gas-discharge tube. However, by this specification for signal 8, it is not intended the invention should exclude other sorts of signal devices of similar value to the invention, such as incandescent lamps, buzzers, bells and the like.

Particularly illustrated in FIG. 3 is operation of the inventive circuitry in the same general manner as described with respect to FIG. 2, despite the heater's including, as set forth fully in this FIG. 3, both the conventional supplementary heater element 14 and the conventional supplementary thermostat 13.

Moreover, the same general manner of operation persists despite this invention's additive combination with supplementary hand switch 15, series connected between high-voltage leg 3 and conventional supplementary heater element 14, through the use of which, as a prior explanation has set forth, the user can make extra energy savings. FIG. 3 shows supplementary hand switch 15 closed; hence, in this momentary condition, the circuit operates in this particular conventionally. But the moment the user opens supplementary hand switch 15 an effectual transformation occurs whereby, so long as switch 15 remains open, the operational heater's electrical innards look like the one-heater-element, one-thermostat depiction of FIG. 2.

Tracing now the FIG. 3 circuit, principal thermostat 9 being, conventionally, double-acting, directs the make/break action of principal hand switch 6 to either conventional heater element 10 or conventional heater element 14, depending upon which pole of 9 the conventional bi-metallic blade of the thermosensitive device is contacting. Similarly, inventive signal lamp 8 being connected, at junction 11, with the same double-acting principal thermostat 9, its blinkings track the energy state of whichever partial circuit 9 selects. In the particular case shown as the momentary circuit state in FIG. 3, when supplementary hand switch 15 is closed, no Option ambiguity arises nor any difference of signal lamp action. As FIG. 3 shows, lamp 8 is not lighted and principal switch 6 is open ('OFF'). The Option Table shows this condition to be Option 4: ergo, concludes the user, water is not heating because the controlling thermostat has cycled OFF. This, inspection of the FIG. 3 transient verifies: not only is the principal thermostat 9 'OFF' insofar as concerns heating element 10, but supplementary thermostat 13, momentarily controlling because of its nether location conventionally, also is 'OFF' insofar as concerns its control function, that of thermosensitively cycling the energizing of conventional heater element 14.

As the user watches the momentary state of signal lamp 8 and principal switch 6 which FIG. 3 illustrates, the signal lamp 8 may flash ON. Let us say, by way of illustration, that it does. This automatic illumination of lamp 8 occurs either because of hot water use on the premises or because of stored-water cool-off. It is at this point in the user's relationship with the equipment, as improved by the present invention, that the user typically makes the decision—based upon all relevancies—between closing manual switch 6 to start up again the heating cycle, or to leave manual switch 6 open to effect energy saving until a hot water need, sensed by a human rather than by a mechanism, arises.

Having described my invention, what I claim is:

1. In an electric water heater energizing circuit comprising a resistive heater means, a three-wire electric supply system and thermostat means, a first leg of said three-wire system connected to a first contact means of said thermostat means, said thermostat means and said heater means serially connected in a second leg of said three-wire system with one end of said heater means electrically connected to a second contact of said thermostat means, and wherein the improvement comprises: a signal system means comprising switch means connected in said first leg and an electric signal system connected through a third leg of said system to said first contact means whereby the visible switch ON/OFF positions and the signal means provide a simple code to the hidden transient thermal and thermostat conditions within said water heater as an aid to economical power supply control through management of said hand operable switch means.

2. In an electric water heater energizing circuit comprising a three-wire electric supply system, a principal resistive heater and a principal double-acting bladed thermostat, a first leg of said three-wire system connected to a blade contact of said principal thermostat, said principal thermostat and said principal heater connected serially in a second leg of said three-wire system with one end of said principal heater connected to one contact of said principal thermostat, a supplemental resistive heater with a serially connected, supplemental, single-acting, bladed thermostat connected to a second contact of said principal thermostat and to said second leg, and wherein the improvement comprises: an electric signal system comprising a principal electric switch electrically connected in said first leg and an electric signal means connected through a third leg of said system to said blade contact whereby the visible principal-switch ON/OFF positions and the signal means provides a simple code to the hidden transient thermal and thermostat conditions within said water heater as an aid to economical power supply control through management of said hand operable principal switch.

3. The electric water heater circuit of claim 2 further comprising supplemental switch means serially connected between said supplemental heater means and said second leg to provide manual control of said supplemental heater.

* * * * *